(12) United States Patent
Ruano Del Campo et al.

(10) Patent No.: US 6,565,902 B2
(45) Date of Patent: *May 20, 2003

(54) MOLD AND METHOD FOR MANUFACTURING A FROZEN CONFECTIONERY

(75) Inventors: Miguel Ruano Del Campo, San Cugat del Valles (ES); Eduardo Domenech Sendra, Alzira (ES)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,279

(22) Filed: Sep. 3, 1999

(65) Prior Publication Data

US 2002/0094362 A1 Jul. 18, 2002

Related U.S. Application Data

(63) Continuation-in-part of application No. PCT/EP98/00907, filed on Feb. 16, 1998.

(30) Foreign Application Priority Data

Mar. 4, 1997 (EP) .............................. 97200625
Mar. 5, 1997 (EP) .............................. 97200664

(51) Int. Cl.[7] .............................. A23G 9/26; A23P 1/10
(52) U.S. Cl. .................... 426/134; 426/91; 426/104; 426/249; 426/306; 426/421; 426/515; 425/126.2; 425/442
(58) Field of Search ............................. 426/91, 95, 100, 426/101, 104, 134, 421, 515, 306, 279; 425/442, 126.2

(56) References Cited

U.S. PATENT DOCUMENTS

| | | | | |
|---|---|---|---|---|
| 2,003,612 A | * | 6/1935 | Schnaier | 249/92 |
| 2,036,706 A | * | 4/1936 | Law | |
| 2,123,215 A | * | 7/1938 | Thomas | 426/279 |
| 2,747,525 A | * | 2/1948 | Lund | 426/249 |
| 2,927,544 A | | 8/1957 | Kolander | |
| 2,840,011 A | * | 6/1958 | Rasmusson | |
| 3,907,245 A | * | 9/1975 | Linder | 249/94 |
| 4,189,289 A | * | 2/1980 | Getman | 425/93 |
| 4,396,367 A | | 8/1983 | Gram | 425/441 |
| 4,548,573 A | | 10/1985 | Waldström | 425/442 |
| 4,746,523 A | * | 5/1988 | Binley | 426/249 |
| 5,066,502 A | | 11/1991 | Eales | 426/75 |
| 5,343,710 A | * | 9/1994 | Cathenaut et al. | 62/71 |
| 5,738,895 A | * | 4/1998 | Fuchs et al. | 426/515 |
| 5,789,005 A | * | 8/1998 | Tabaroni et al. | 426/104 |
| 6,156,359 A | * | 12/2000 | Segal | 426/241 |

FOREIGN PATENT DOCUMENTS

| | | |
|---|---|---|
| DE | 711896 | 10/1941 |
| FR | 653870 | 3/1929 |
| FR | 2502467 | 3/1982 |
| FR | 2535581 | 3/1984 |
| GB | 236985 | 7/1925 |

* cited by examiner

Primary Examiner—Milton I. Cano
Assistant Examiner—Robert A Madsen
(74) Attorney, Agent, or Firm—Winston & Strawn

(57) ABSTRACT

The present invention is directed to a three dimensional confectionery of frozen confectionery which can be easily handled and consumed, consists of a frozen confectionery body and a handling member for holding it. The handling member passes through the body and projects from the ends of the body, so that the confectionery can be consumed while being held by the two ends with both hands. The invention is also directed to a process for making and a mold and production line apparatus for making the confectionery.

25 Claims, 2 Drawing Sheets

MOLD AND METHOD FOR MANUFACTURING A FROZEN CONFECTIONERY

This application is a continuation-in-part of PCT application PCT/EP98/00907 filed Feb. 16, 1998

FIELD OF THE INVENTION

The invention is directed to a frozen confectionery, process for making, and apparatus and mold for manufacturing a frozen confectionery.

BACKGROUND OF THE INVENTION

Frozen confectionery consumer articles, known as "impulse purchase" are generally awkward to handle and consume once their packaging is opened. The frozen confectioneries generally have either a stick by which they are held with one hand, as in the case of an ice popsicle, or a receptacle which also enables them to be held in one hand, such as, a wafer for ice cream cones. Nevertheless, in all cases it is difficult, for example for a child, to eat the confectionery to the end without the confectionery dripping or breaking into pieces.

Many small articles of frozen confectionery with a stick are produced by molding in molds which are generally made of metal. These molds may consist of one or more parts and, in the latter case, the various parts of the mold must be opened or separated when the confectioneries are demolded.

To produce ice popsicles having one or more convex parts, for example having bulges with a rounded or raised shape and re-entrant parts, it is not possible to use metal molds made of a single piece. The latter have a flared shape with a certain clearance dictated by the necessity for demolding the confectionery, once it is hardened, by an upward vertical movement. Moreover, these molds necessarily lead to the production of a flat upper face imposed by filling the mold with the liquid composition to be frozen. In addition, in order to demold the confectioneries from these molds in one piece, the cavity of the mold must have no re-entrant part or else it will be impossible to demold the confectionery.

According to French Patent No. 2,535,581, the production of confectioneries having a so-called "undemoldable" shape has been resolved by means of metal molds consisting of two opposite shaped half-shells which are hinged longitudinally. Since the half-shells are held firmly against each other, they are filled with a composition to be frozen through an upper opening through which a stick is inserted, cooled in a cold air freezing tunnel, warmed, and the half-shells are opened so as to free the molded confectioneries. The half-shells may include an elastic seal along their mutually contacting surface ensuring the leak tight seal of the mold cavity so as to prevent any leakage of the liquid composition during filling and hardening.

Another method, described in French Patent No. 2,502,467, consists of using half-shells with a rounded convex shape in their inner part but without any raised portions on the outside. These half-shells are inserted longitudinally in a master mold while remaining in contact therewith. The master mold containing the half-shell is cooled in a tank of cooling liquid (brine or glycol and water), which represents an advantage compared with cooling in a tunnel but is more costly. The two half-shells, however, have to be extracted vertically from the master mold when confectioneries are demolded and then separated laterally to free the confectionery. The operations involve the use of mechanical extraction and demolding devices which are relatively complex and bulky.

French Patent No. 653,870 discloses an article of frozen confectionery which consists of a frozen block having the shape of a geometric figure. The article is surrounded by a waterproof paper and a rod serving as a handle at one of the ends or several rods serving as handles.

German Patent No. 711,896 discloses a popsicle of standard frustoconical shape comprising a handling member consisting of a cylindrical hollow straw A, located on the axis of revolution of the popsicle and bearing a transverse sliding disc B of low thermal conductivity, the disc serves as support at the base of the popsicle. After formation of the body of the popsicle around the straw and on the disc, the assembly is wrapped with an insulating envelope for delivery and consumption. The straw projects slightly from the end of the popsicle constituting the top of the truncated cone, such that the one can slide the straw through the support disc and popsicle, but not with enough space to hold the popsicle.

U.S. Pat. No. 5,066,502 discloses a sweet confectionery lollipop of the hard sugar candy type comprising a member which passes though the lollipop from one end to the other, allowing the lollipop to be held by both ends. In some versions, the handling member consists of a rod curved into a loop on each end of the article fixed in a support member into which it is inserted and the lollipop is formed around the support member.

There remains a need for improvement in the construction and manufacture of these type products and the present invention satisfies this need.

SUMMARY OF THE INVENTION

The present invention relates to a method of making a three dimensional frozen confectionery comprising placing a handling member having a central portion and first and second ends between first and second sections of a mold; sealingly engaging the second end of the handling member by closing the first and second mold sections to form a cavity around the central portion of the handling member and to define an opening adjacent the first end of the handling member; directing a first liquid confectionery into the mold cavity through the opening; cooling the mold cavity to a temperature which is sufficiently low to freeze the confectionery; and demolding from the mold a three dimensional frozen confectionery having exposed first and second ends of the handling member.

In this method, the first and second mold sections may be configured with portions that form a chamber which sealingly receives the second end of the handling member and retains the handling member in a center position of the cavity. Also, the cavity can be created by in-line hot blow molding of two thermoplastic sheets which are sealed and which can be detached from each other by peeling. Preferably, the cavity is cooled by placing the mold in a freezing fluid environment, cold air tunnel, or combination thereof after the confectionery is directed therein. Also, the demolding step includes applying heat to the cavity to assist in releasing then confectionery from the first and second mold sections.

This method also includes partially filling the cavity with the first liquid confectionery, cooling the first liquid confectionery to form a first portion of the frozen confectionery, then directing a second liquid confectionery into the cavity and cooling to form a second portion of the frozen confectionery adjacent the first portion. If desired, one or more third liquid confectioneries can be directed into the cavity and then cooled to form additional portions of the frozen confectionery.

This method also includes emptying a portion of the first liquid confectionery from the cavity after partial cooling to form a first layer on the first and second mold sections and then directing a second liquid confectionery into the cavity to form a second layer of the second confectionery adjacent the first layer. If desired, a portion of the second liquid confectionery can be emptied from the cavity after partial cooling to form a second layer on the first layer and then a third liquid confectionery can be directed into the cavity to form a third layer of the third confectionery adjacent the first layer.

The liquid confectionery can contain inclusions including one or more of chocolate, nuts, fruits, a sauce, a syrup or a mixture thereof in an amount sufficient to change the appearance of the confectionery. The frozen confectionery can be coated after demolding, wherein the coating is substantially applied to the frozen confectionery but not the ends of the handling member. When the confectionery comprises ice cream, the coating may be a chocolate applied by rolling or spraying. When the confectionery comprises a water ice or sorbet, the coating may be water applied by spraying to form a protective surface glaze.

The invention also relates to a mold for manufacturing a frozen confectionery about the handling member. The mold comprises first and second mold sections operatively associated for movement between open and closed positions, with the mold sections, when in the closed position, capable of sealingly engaging an end of the handling member, forming a cavity around the central portion of the handling member, and defining an opening adjacent the first end of the handling member, and, when the mold sections are in the open position, the frozen confectionery and handle member may be removed therefrom.

The invention also relates to an apparatus for manufacturing the frozen confectionery, comprising the handling member and mold described above, with means for directing a first liquid confectionery into the mold cavity through the opening; means for cooling the mold cavity to a temperature which is sufficiently low to freeze the confectionery; and means for demolding from the mold a three dimensional frozen confectionery having exposed first and second ends of the handling member.

Preferably, a plurality of molds operatively associated and traveling in time with an endless conveyor chain are used for producing multiple frozen confectioneries. The conveyor chain advantageously cooperates with the mold sections on a forward run to keep the mold sections tightly against each other and sealingly engaged with the second end of the handling member during filling of the cavity with the liquid confectionery and subsequently during hardening of the liquid confectionery, and on a return run of the conveyor chain, to separate the mold sections from each other.

The invention also relates to an edible three dimensional frozen confectionery comprising a three dimensional body made of frozen confectionery and comprising at least one convex surface; and a handling member having a central portion and first and second ends, with the ends extending from the body to form a dual handle for manipulating the frozen confection.

BRIEF DESCRIPTION OF THE DRAWINGS

Preferred features of the invention are now described in connection with the following drawing figures wherein.

DETAILED DESCRIPTION OF THE INVENTION

Figure 1:
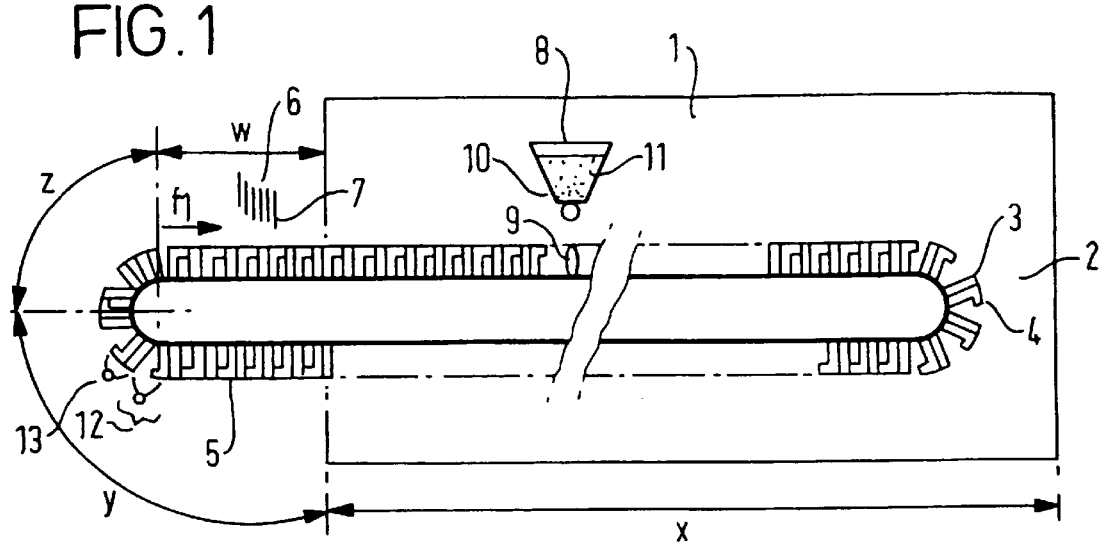
FIG. 1 is a general diagram of the apparatus showing various stations for producing a three dimensional confectionery by molding.

The frozen confectionery of the present invention comprises a frozen confectionery body, where the body has one or more convex parts with bulges in relief and indentations, the body is molded in a multi-section mold, and at least one handling member, preferably a stick, for holding the confectionery passing through the body, wherein the handling member projects sufficiently from the ends of the body so that the confectionery can be consumed while being held by the two ends of the handling member with both hands. Preferably, the body can be held in particular in a horizontal position with both hands. In this position, there is much less risk of the frozen confectionery dripping or becoming detached from the stick than in the case of the commercially known confectioneries.

The process according to the present invention comprises forming a three dimensional body of frozen confectionery around a handling member, preferably a stick, wherein the handling member projects sufficiently from the body so that confectionery can be handled and consumed while being held by the two ends, thereafter, the confectionery is hardened and wrapped.

The apparatus according to the present invention comprises a cooling zone, a demolding zone which includes a reheating zone, and a zone without cooling or reheating wherein the handling member is inserted into the mold. Within the cooling zone the molds are cooled and filled with the confectionery composition. After an adequate amount of cooling time, the molds are superficially heated and demolded. During demolding, the confectionery is removed from the mold and optionally coated. The apparatus and mold of the present invention will be further described in the following preferred embodiments.

The confectionery of the present invention comprises at least one ice cream, flavored ice water, other suitable frozen confectionery ingredients, or a mixture thereof. The confectionery may contain one or more layers either as different flavors arranged in a vertical fashion, or as a confectionery that is multilayered. Multilayered confectioneries include those having layers from the interior to the exterior of the confectionery or those with an interior core and at least one layer of another confectionery ingredient surrounding the core.

Optionally, the frozen confectioneries may contain inclusions including, but not limited to, distinct particles and pieces, for example of chocolate, praline, caramel, dried, nuts, jellied or crystallized fruits or inclusions, sauce or syrup giving a marbled appearance, or mixtures thereof. These inclusions enhance the appearance of the confectionery.

Once demolded, the confectioneries may optionally be coated with a coating of chocolate or other coating material and optionally added solid particles. Care should be taken to limit the coating to the body of the frozen confectionery without splashing the coating to any appreciable extent onto the parts of the handling members projecting from the body.

Preferably, the coating can be done by means of a coater using applicator rollers alone or combined with a low pressure spray.

Confectioneries comprising water ice or sorbet may be covered with a thin layer of water, for example by spraying, to provide them with a protective surface glaze which can also be attractive. Water containing food coloring can be used to impart a color to the surface glaze.

The process of the present invention may include a step for placing a handling member, preferably a wooden or plastic stick, between a mold cavity formed from two opposite facing mold sections held tightly against each other, passing through the cavity. The handling member projects from two opposite ends of the cavity in a substantially axial position from the center of the cavity. The lower part of the handling member is placed in a housing in the axial extension of the cavity and the housing is adjusted such that the handling member is held tightly, i.e., the handling member has a minimum amount of play and is sealed to prevent leakage of the liquid confectionery around it. Through an upper opening of the cavity, a composition to form the frozen confectionery is introduced in liquid form into the cavity. The cavity, mold sections or composition is then cooled and frozen using conventional means, and subsequently, the confectionery is demolded. Advantageously, the cavity or mold sections may be heated using conventional means to assist in the demolding of the frozen confectionery.

The cavity or mold can be cooled by any conventional means. The mold may be cooled by passing the mold through a freezing fluid environment, preferably in a cold air tunnel, after the step of inserting the handling member and before the demolding or reheating step.

The process may further comprise after filling the mold with composition and partially freezing the composition, the still liquid composition in the center of the cavity is emptied or extracted, thus forming a shell or layer on the mold sections. Subsequently, the free space of the cavity is then filled with a second liquid confectionery composition. These steps of emptying and filling of the free space of the cavity can be performed outside of the cold air tunnel. Preferably, the process is repeated several times to form layered products.

The process may include creating the mold cavity by in-line hot blow molding of between two thermoplastic sheets which are sealed and which later can be detached from each other by peeling. The cavity can be connected to a filling channel at first end and extended axially through a housing at a second end. The housing is adjusted against the handling member with a minimum of play and serves to guide the handling member at the moment of insertion and hold the position during filling. The handling member is placed in the housing and a composition for a frozen confectionery in liquid form is introduced through at least one filling channel into the cavity. Subsequently, the confectionery is cooled and frozen.

Thereafter, the confectionery can simply be demolded by peeling away one of the thermoplastic sheets. The sheets can also be cut around the seal line, in which case, the sheets serve as a mold and also as packaging for the confectionery.

The apparatus according to the present invention comprises a molding assembly comprising of two complementary mold sections hinged longitudinally and forming a cavity and a mold support bar. The mold support bar is fixed to a conveyor chain such that the mold support bar travels along the conveyor chain. The mold support bar cooperates with the conveyor chain to keep the mold sections held tightly against each other during the insertion of a handling member. This tight hold on the mold sections is maintained during the filling of the cavity and hardening of the confectionery while on the conveyor. The tight hold also aids to separate the mold sections from each other on extraction during the inward curving rising part of the conveyor. The apparatus also includes means for cooling the molding assembly, means for inserting and positioning the handling member into the cavity, means for filling the molding assembly with composition, means for reheating the molds, means for opening the mold sections to demold the confectionery, a device for diagonally extracting the molded confectioneries, and optionally, a second conveyor chain for removing the demolded confectioneries.

The apparatus may also include means for removing a liquid portion of the composition within the cavity so as to form a shell. Optionally, the apparatus includes means for filling the shell with a second composition to form a multilayered frozen confectionery. The apparatus may optionally include means for glazing demolded confectioneries.

The invention is also directed to a mold for manufacturing a frozen confectionery comprising two mold sections hinged longitudinally and forming a molding cavity. An opening is provided in the upper part of the cavity for the insertion of a handling member, preferably a stick, and for filling with liquid composition. The lower part of the cavity is extended by an axial housing in which the handling member is inserted with a minimum of play. The handling member is held in position centrally by a resilient element resting on the handling member in the housing.

The invention will be better understood by means of the detailed description given with reference to the accompanying figures illustrating preferred embodiments of the process and an embodiment of the apparatus and mold according to the invention which are presented by way of example. In the figures, the same reference numbers indicate the same components.

FIG. 1, illustrates an apparatus of the present invention comprising a zone without freezing and without reheating W, a freezing zone X, a zone for surface reheating Y, and a demolding zone Z. The freezing zone X is inside a cold air tunnel 1 at a temperature of between about −30° C. to about −32° C., preferably at a lower temperature. Optionally, the apparatus comprises a colder rapid freezing tunnel such as a tunnel which uses liquid nitrogen sprayed or trickled over the molds. For reasons of simplifying the figures, the distances indicated for the different zones W, X, and Y do not correspond to the actual distances necessary for the appropriate heat transfers. In addition, certain components are not shown for reasons of clarity. For example, only one mold is shown whereas a mold support bar supports rows of molds. The molds are hinged on an endless transporter chain which itself forms a conveyer. Similarly, the mold bars form links of an endless chain, only part of which has been shown. In the following description, the term "mold" will in fact be used to indicate a row of molds hinged on a mold bar.

A mold 2, formed of two longitudinally hinged section molds 3 and 4, travels along the conveyor in the direction of the arrow f1 in the zone W by the stepwise translational movement of the endless chain 5. A step consists of the distance between two consecutive molds. In zone W, as well as in the various straight parts of the chain in zones X and Y, the molds as well as the section molds of which they consist are kept tightly in contact with each other by chain 5. Hooks and catches made of a resilient material (see, FIG.

2) serve at the same time to interlock the successive molds together. The hooks and catches may be connected at the upper parts of the mold to keep each mold closed in the zones W, X, and Y by latching onto corresponding shoulders on the molds. The attachment is carried out in a reversible manner, i.e. the section molds may be easily opened and the molds separated by unlatching.

The mold 2 arrives at the station 6 where a handling member 7 is inserted. The mold 2 then travels inside the zone X where it is cooled, for example at a temperature between about −3° C. to about −4° C. before being filled. The prior cooling of the mold enables a thin outer frozen envelope to form under the effect of rapid freezing which acts as a seal and prevents any liquid material from escaping. At station 8, the cavity 9 formed between the two mold sections of the mold is filled by means of a metering device (not shown) situated inside the tunnel and supplied from a hopper 10 which is outside the tunnel with a composition to be frozen 11. For example, a composition includes a lemon water ice having approximately 25% dry matter containing sucrose, glucose syrup, a mixture of thickeners, lemon concentrate, and a lemon flavor. The composition is previously homogenized, pasteurized, cooled from between about 3° C. to about 6° C. and aged for several hours at this temperature. The composition is solidified under the effect of cooling. The time spent passing through the tunnel 1 being between about 35 minutes to about 45 minutes.

The mold 2 leaves the zone X on chain 5 to enter into the reheating zone Y. The mold is reheated on the surface in 12 from the bottom by means of the nozzles 13 delivering a hot fluid. The hot fluid may include steam, hot air, or both and may be delivered preferably by jets of hot water or hot glycol-containing water. Preferably, the temperature of the hot fluid is about 25° C. or greater which facilitates the subsequent demolding of the confectionery. Alternatively the heat may be of electrical origin, for example by radiation or induction.

Figure 2:
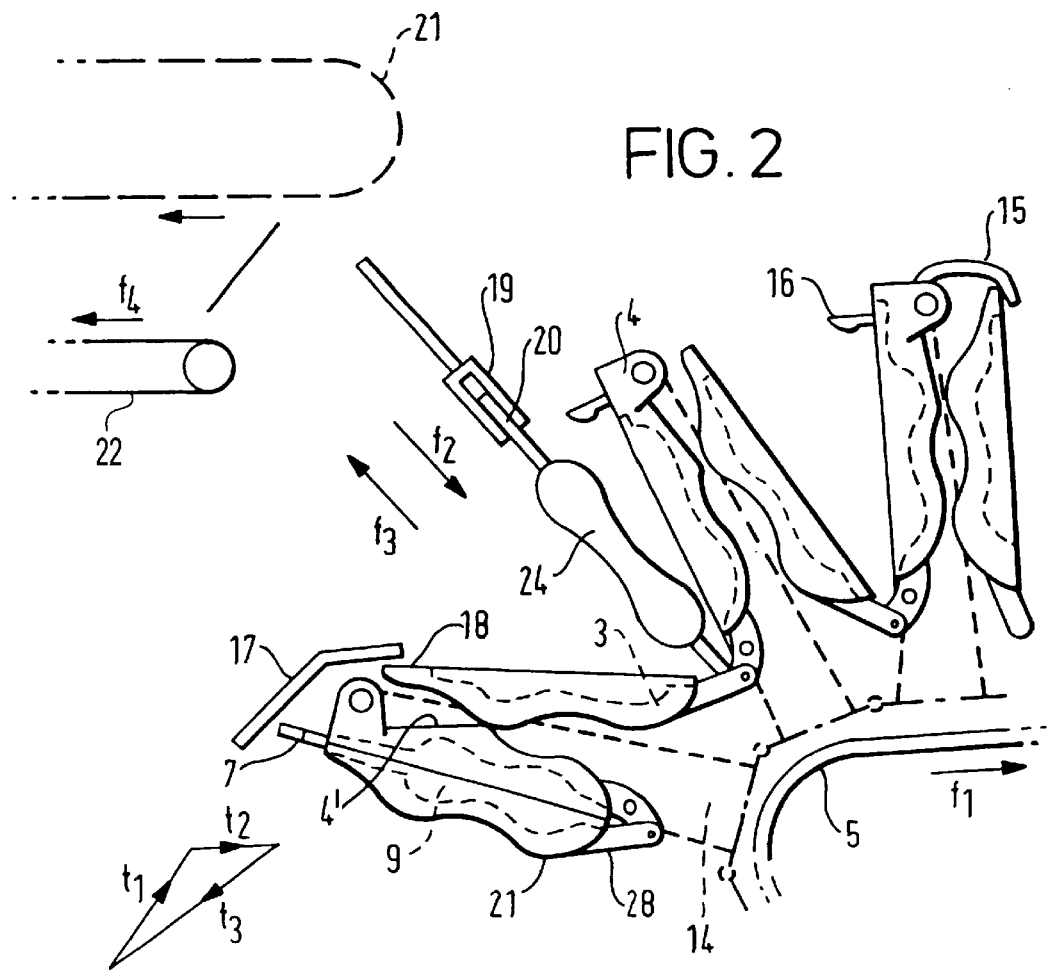
FIG. 2 shows diagrammatically the operations of demolding a confectionery.

FIG. 2 illustrates the demolding process. The molds separate from each other in the demolding zone Z at the same time as the mold bars 14 move through the inward-curving part of the chain 5. During demolding the motion acts against hook 15 which keeps the molds 2 together. Because the mold sections 3 and 4 are still held against each other by catch 16, the molds are forced open by means of the lever 17. Lever 17 functions by moving against a projection 18 of the mold sections 3 which overlaps the upper edge of the mold. Lever 17 is guided in a complex triangular movement over three periods ($t_1$, $t_2$, and $t_3$) by means of actuators (not shown). During a first period, lever 17 rises generally slantwise above the projection 18, during a second period lever 17 approaches the mold 2 horizontally, and during a third period lever 17 falls generally vertically while carrying the mold sections 3 downwards, until the latter butts up against the following half-mold 4'. Simultaneously, a raising and lowering device descends along the arrow $f_2$ and brings a clamp 19 which grasps the end of the handling member 20 and extracts the confectionery by raising the confectionery along the arrow $f_3$ along a path inclined at approximately 45°. The operations of opening the mold 2 and of simultaneously extracting the confectionery take place during the time that the chain has stopped.

Once a confectionery has been extracted, the confectionery is taken by chain 21 to an optional spraying device for applying a surface glaze. The optional spraying device may include means of a tank normally used for applying a coating of chocolate. The confectionery, once optionally coated, is then discharged and removed along the direction of arrow $f_4$ by means of conveyer belt 22 to a packaging apparatus where the confectionery is wrapped using a wrapping devices such as a "flow-pack."

Figure 3:
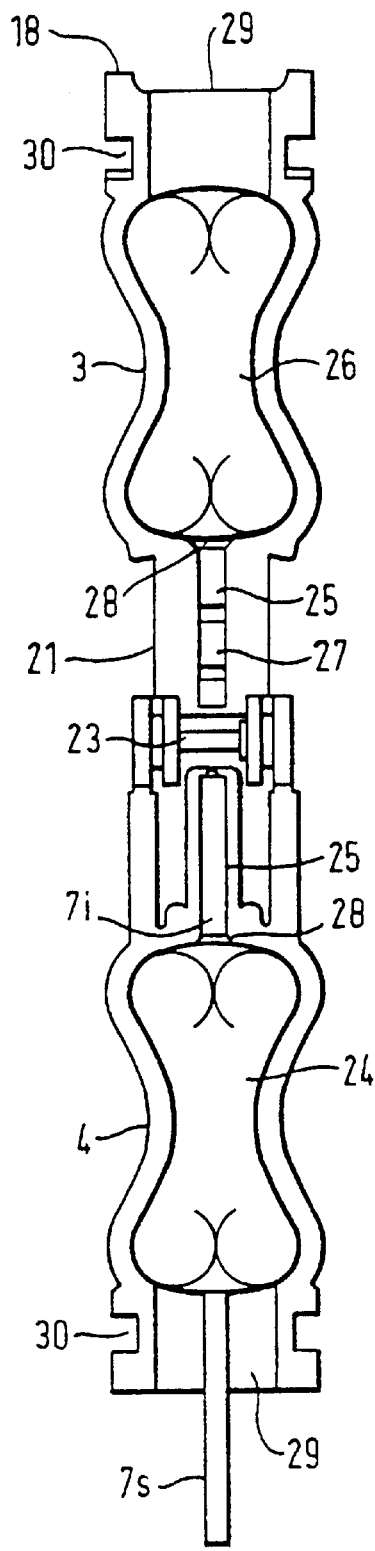
FIG. 3 is a front view of a mold for manufacturing a confectionery, in an open position, with the frozen confectionery in the molding cavity.

FIG. 3 is a representation of mold 2 when open and the confectionery, for purposes of illustration, has a bone shape and is disposed in the mold section 4. The mold material may be cast aluminum with thick walls which may or may not be anodized or coated with Teflon. The mold 2 comprises two mold sections 3 and 4 hinged longitudinally about the hinge pin 23. The handling member 7, having a circular cross-section, passes through the body 24 of the frozen confectionery and projects from the ends of the latter. The handling member has an upper part 7s which is about ⅔ of the lower part 7i. The lower part 7i of the handling member is lodged such that there is a minimum amount of play in a cylindrical space 25 provided in the mold sections 3 and 4. When the half-cavities such as 26 are joined firmly together to form a cavity 9 and the handling member 7 is put in place in the mold, the handling member fits into the space 25 and is held in place without sliding by a tab 27. Tab 27 and handling member 7 form a sealed plug preventing any escape of liquid in the inverted frustoconical shaped bottom 28 of the cavity 9. The liquid composition to be frozen is introduced into the cavity 9 through an upper opening 29. Notches 30 serve for the passage of the catch 16 which when interlocked hold the mold sections 3 and 4 together. Alternatively, the confectionery may have a flat handling member 7, in which case the bottom 28 has the form of a section of an inverted truncated pyramid with a rectangular cross-section.

Figure 4:
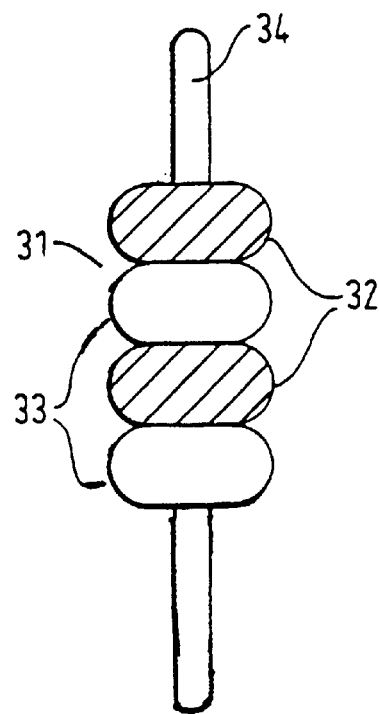
FIG. 4 is a frontal view of a diagrammatic illustration of a variant of a confectionery according to the present invention.

FIG. 4 illustrates a confectionery 31, which is produced by molding and metering successively, around the handling member 34, several frozen compositions with different flavors and colors such as orange 32 and lemon 33. Several metering devices supplied by successive hoppers situated at various suitable places in the tunnel 1 can provide an endless assortment of frozen compositions.

Although one mold has been shown in the preceding description, the illustrations can be applied to rows of molds, preferably 4 to 12 molds on a bar. Without departing from the scope of the invention, the present invention also includes methods to produce confectioneries by means of an apparatus with a carousel comprising various stations as previously described instead of a linear apparatus.

What is claimed is:

1. A method of making a three dimensional frozen confectionery, comprising:

placing a handling member having a central portion and first and second ends between first and second sections of a mold that are pivotally connected together about a hinge configured to retain the first and second sections in pivotal attachment with each other both with the mold open and closed;

pivoting the first and second mold sections about the hinge to:

close the mold and form a cavity around the central portion of the handling member with the first and second ends of the handling member exposed from the mold cavity, seal the cavity from the second end of the handling member, and define an opening around the first end of the handling member such that the first end is received through the opening;

directing a first fluid confectionery into the mold cavity through the opening with the first end received through the opening;

freezing the confectionery in the mold around the handling member;

pivoting the first and second mold sections about the hinge to open the mold; and demolding from the open mold the frozen confectionery.

2. The method of claim 1, wherein the freezing of the confectionery comprises cooling the mold cavity to a temperature sufficiently low to freeze the confectionery in the mold cavity.

3. The method of claim 2, wherein the cooling of the cavity comprises placing the mold in a freezing fluid environment, cold air tunnel, or combination thereof after the confectionery is directed therein.

4. The method of claim 1, wherein the closing of the mold sections comprises sealingly engaging a second end of the handling member by the closing of the mold sections.

5. The method of claim 1, wherein the frozen confectionery comprises ice.

6. The method of claim 1, wherein the closing of the mold sections comprises hot blow-molding a plurality of thermoplastic sheets and sealing the sheets about the cavity such that the sheets can be detached from each other by peeling.

7. The method of claim 1, wherein the demolding of the confectionery comprises applying heat to the cavity to assist in releasing then confectionery from the first and second mold sections.

8. The method of claim 1, further comprising directing a second liquid confectionery into the cavity with the frozen first confectionery and cooling the second confectionery to form first and second contacting and distinct portions of the frozen confectionery.

9. The method of claim 1, further comprising emptying a portion of the first liquid confectionery from the cavity after partial freezing to form a first layer on the first and second mold sections and then directing a second liquid confectionery into the cavity to form a second layer of the second confectionery adjacent and in contact with the first layer.

10. The method of claim 9, further comprising emptying a portion of the second liquid confectionery from the cavity after partial freezing to form the second layer on the first layer and then directing a third liquid confectionery into the cavity to form a third layer.

11. The method of claim 1, further comprising adding to the liquid confectionery inclusions that comprise one or more of chocolate, nuts, fruits, a sauce, a syrup or a mixture thereof in an amount sufficient to change the appearance of the confectionery.

12. The method of claim 1, further comprising coating the frozen confectionery after demolding, wherein the coating is substantially applied to the frozen confectionery but not the ends of the handling member.

13. The method of claim 12 wherein the confectionery comprises ice cream, the coating comprises chocolate and the coating is applied by rolling or spraying.

14. The method of claim 12, wherein the confectionery comprises a water ice or sorbet, the coating comprises water and is applied by spraying to form a protective surface glaze.

15. The method of claim 1, wherein the handling member is inserted with the mold sections attached at the hinge, and the opening of the mold comprises pivoting the mold sections about a hinge pin of the hinge and retaining the mold sections attached by the hinge.

16. The method of claim 1, wherein the hinge is disposed on a side of the mold substantially opposite from the opening.

17. The method of claim 1, further comprising latching the mold sections to mold sections of adjacent molds in the open position.

18. The method of claim 1, further comprising conveying the mold about a closed circuit along with a plurality of said molds to repeat said method for making a plurality of said frozen confectioneries with exposed first and second ends of handling members.

19. The method of claim 1, wherein the handling member comprises a stick and the confectionery is molded such that the exposed ends project sufficiently from the frozen confectionery for holding from the ends during handling and consumption.

20. The method of claim 1, further comprising retaining the mold sections retained in pivotal attachment with the mold open.

21. The method of claim 1, wherein the frozen confectionery is demolded from the open mold with the first and second ends exposed from the confectionery.

22. A frozen-confectionery mold, comprising:

first and second mold sections;

a hinge pivotally attaching the mold sections together and configured for allowing the mold sections to pivot between open and closed positions while remaining attached together;

a mold cavity defined between the mold sections and configured for receiving and molding the confectionery in the closed position, the mold sections defining therebetween an opening in fluid communication with the cavity and configured for receiving a handling member in a molding position with a first end of the handling member extending through the opening exposed from the mold cavity and with a central portion of the handling member extending across the cavity, the opening being configured for receiving the confectionery directed therein in a fluid state with the handling member in the molding position for filling the cavity with the fluid confectionery;

an end handling portion defined between the mold sections and configured for holding a second end of the handling member sealed and exposed from the cavity for supporting the handling member in the molding position; and a cooling device in cooling association with the mold for cooling the mold to a temperature for freezing the confectionery in the cavity to produce a frozen confectionery with protruding first and second ends.

23. The mold of claim 22, further comprising a catch associated with the first mold section and configured for catching on another mold section of an adjacent mold to retain the first and second mold sections in the open position for demolding the frozen confectionery.

24. The mold of claim 22, wherein the hinge comprises a pinned hinge.

25. A frozen confectionery manufacturing device, comprising:

a plurality of molds of claim 22;

a conveyer configured for moving the molds in a closed circuit for making a plurality of said frozen confectioneries with exposed first and second ends of said handling members thereof.

* * * * *

UNITED STATES PATENT AND TRADEMARK OFFICE
CERTIFICATE OF CORRECTION

PATENT NO. : 6,565,902 B2
DATED : May 20, 2003
INVENTOR(S) : Ruano Del Campo et al.

It is certified that error appears in the above-identified patent and that said Letters Patent is hereby corrected as shown below:

<u>Column 9,</u>
Line 25, change "releasing then confectionary" to -- releasing the confectionery --;
Lines 34 and 37, "first layer" to -- shell --;
Line 36, change "cavity" to -- shell --, and delete the first occurrence of "second";
Line 40, delete "second", and change "on the first" to -- of the second confectionery in the shell --;
Line 41, delete "layer"; and
Line 42, change "a third" to -- another --.

Signed and Sealed this

Thirtieth Day of September, 2003

JAMES E. ROGAN
*Director of the United States Patent and Trademark Office*